(12) United States Patent
Ballal et al.

(10) Patent No.: US 11,095,240 B2
(45) Date of Patent: Aug. 17, 2021

(54) ELECTRIC MOTOR IN PROPULSION SYSTEM WITH AUXILIARY POWER GENERATION

(71) Applicant: GM GLOBAL TECHNOLOGY OPERATIONS LLC, Detroit, MI (US)

(72) Inventors: Siddharth Ballal, Shelby Township, MI (US); Anno Yoo, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 16/515,695

(22) Filed: Jul. 18, 2019

(65) Prior Publication Data

US 2021/0021219 A1 Jan. 21, 2021

(51) Int. Cl.
*H02P 21/09* (2016.01)
*H02P 21/22* (2016.01)
*B60L 50/51* (2019.01)
*B60L 50/60* (2019.01)
*H02P 29/68* (2016.01)

(52) U.S. Cl.
CPC ............. *H02P 21/09* (2016.02); *B60L 50/51* (2019.02); *B60L 50/60* (2019.02); *H02P 21/22* (2016.02); *H02P 29/68* (2016.02); *B60L 2210/44* (2013.01)

(58) Field of Classification Search
CPC .......... H02P 21/09; H02P 21/22; H02P 29/68; B60L 50/51; B60L 50/60; B60L 2210/44
See application file for complete search history.

(56) References Cited

U.S. PATENT DOCUMENTS

2013/0285589 A1* 10/2013 Sugie ................. G05B 19/4155
318/600

* cited by examiner

*Primary Examiner* — Muhammad S Islam
*Assistant Examiner* — Devon A Joseph
(74) *Attorney, Agent, or Firm* — Quinn IP Law

(57) ABSTRACT

A propulsion system having an electric motor and corresponding method. A controller is configured to receive a torque request and selectively command the electric motor. The controller has a processor and tangible, non-transitory memory on which instructions are recorded for a method of generating an auxiliary power. The controller is configured to obtain a desired auxiliary power and a delta factor ($\delta$). The delta factor is set as a speed modifier ($\Delta\omega=\delta$) when the cosine of an angle ($\theta$), between a constant torque unit vector and a decreasing voltage ellipse unit vector, is less than a predefined threshold. A modified rotor speed is obtained as a sum of an original rotor speed and a speed modifier ($\Delta\omega$). The controller is configured to obtain modified stator current commands based on the modified rotor speed and torque request. The auxiliary power is generated by commanding the modified stator current commands.

19 Claims, 2 Drawing Sheets

ELECTRIC MOTOR IN PROPULSION SYSTEM WITH AUXILIARY POWER GENERATION

INTRODUCTION

The disclosure relates to generation of auxiliary power by an electric motor in a propulsion system and a method of controlling operation of the electric motor. The use of purely electric vehicles and hybrid vehicles has greatly increased over the last few years. By employing an electric motor as a propulsion source, many vehicles may operate in one or more electric vehicle modes. For example, a battery electric vehicle may operate exclusively in an electric vehicle mode, while a hybrid electric vehicle may selectively employ one or both of an internal combustion engine and an electric motor during different operating modes.

SUMMARY

Disclosed herein is a propulsion system having an electric motor and a method of controlling operation of the electric motor. The electric motor includes a rotor with at least one permanent magnet and a stator. A controller is configured to receive a torque request and selectively command the electric motor based in part on the torque request. The controller has a processor and tangible, non-transitory memory on which instructions are recorded for a method of generating an auxiliary power.

Execution of the instructions by the processor causes the controller to: obtain a desired auxiliary power and a delta factor ($\delta$) based at least partially on the desired auxiliary power and an estimated power loss for the electric motor. The delta factor is set as a speed modifier ($\Delta\omega=\delta$) when a cosine of an angle ($\theta$) between a first vector and a second vector is greater than or equal to a predefined threshold. A modified rotor speed is obtained as a sum of an original rotor speed and the speed modifier ($\delta\omega$). The controller is configured to obtain modified stator current commands based in part on the modified rotor speed and the torque request. The auxiliary power is generated by commanding the modified stator current commands.

The controller is configured to set the speed modifier to zero ($\Delta\omega=0$) when the cosine of the angle ($\theta$) is less than the predefined threshold. The delta factor ($\delta$) may be obtained by a closed-loop control module configured to obtain an error value as a difference between a desired auxiliary power ($P_{desired}$) and an estimated power loss ($P_{loss}$), limited to a maximum allowable power loss ($P_{loss,max}$). The closed-loop control module is configured to minimize the error value over time by adjusting the delta factor ($\delta$).

The first vector may be a constant torque unit vector ($T_1$, $T_2$) and the second vector may be a decreasing voltage ellipse unit vector ($V_1$, $V_2$). The cosine of the angle ($\theta$) may be obtained as an inner product of the constant torque unit vector ($T_1$, $T_2$) and the decreasing voltage ellipse unit vector ($V_1$, $V_2$) such that: $\cos\theta=(T_1\cdot V_1+T_2\cdot V_2)$. The constant torque unit vector ($T_1$, $T_2$) may be based in part on a partial derivative of the torque request ($T_e$) with respect to a measured q-axis current ($i_q$) and a measured d-axis current ($i_d$) such that:

$$(T_1, T_2) = \left\|-\frac{\partial T_e}{\partial i_q}, \frac{\partial T_e}{\partial i_d}\right\|.$$

The decreasing voltage ellipse unit vector ($V_1$, $V_2$) may be based in part on a partial derivative of a voltage cost function (J) with respect to the measured q-axis current ($i_q$) and the measured d-axis current ($i_d$) such that:

$$(V_1, V_2) = \left\|-\frac{\partial J}{\partial i_d}, -\frac{\partial J}{\partial i_q}\right\|.$$

The voltage cost function (J) may be based on a d-axis voltage command ($v_d$) and a q-axis voltage command ($v_q$) such that: $J=\frac{1}{2}(v_d^2+v_q^2)$. The d-axis voltage command ($v_d$) may be obtained as: $v_d=(i_d{}^*R_s-i_q{}^*\omega'L_q)$. The q-axis voltage command ($v_q$) is obtained as: $v_q=(\lambda_f\omega'+i_q{}^*R_s+i_d{}^*\omega'L_d)$. Here, $\lambda_f$ is a rotor magnet flux magnitude, $R_s$ is a stator resistance, $i_d{}^*$ is the d-axis stator current command, $i_q{}^*$ is the q-axis stator current command, $\omega'$ is the modified rotor speed, $L_d$ is a d-axis static inductance and $L_q$ is a q-axis static inductance.

The propulsion system may include a direct current (DC) power source configured to provide a DC link voltage ($V_{dc}$) to the electric motor and an inverter. A cooling loop may be positioned to be in thermal communication with the electric motor, the inverter and/or the direct current power source. The controller may be configured to at least partially direct the auxiliary power, through the cooling loop, to the inverter and/or the direct current power source. The modified stator current commands may include a d-axis stator current command and a q-axis stator current command obtained from a stored data module based on the modified rotor speed, the torque request and the DC link voltage ($V_{dc}$).

The above features and advantages and other features and advantages of the present disclosure are readily apparent from the following detailed description of the best modes for carrying out the disclosure when taken in connection with the accompanying drawings.

DETAILED DESCRIPTION

Figure 1:
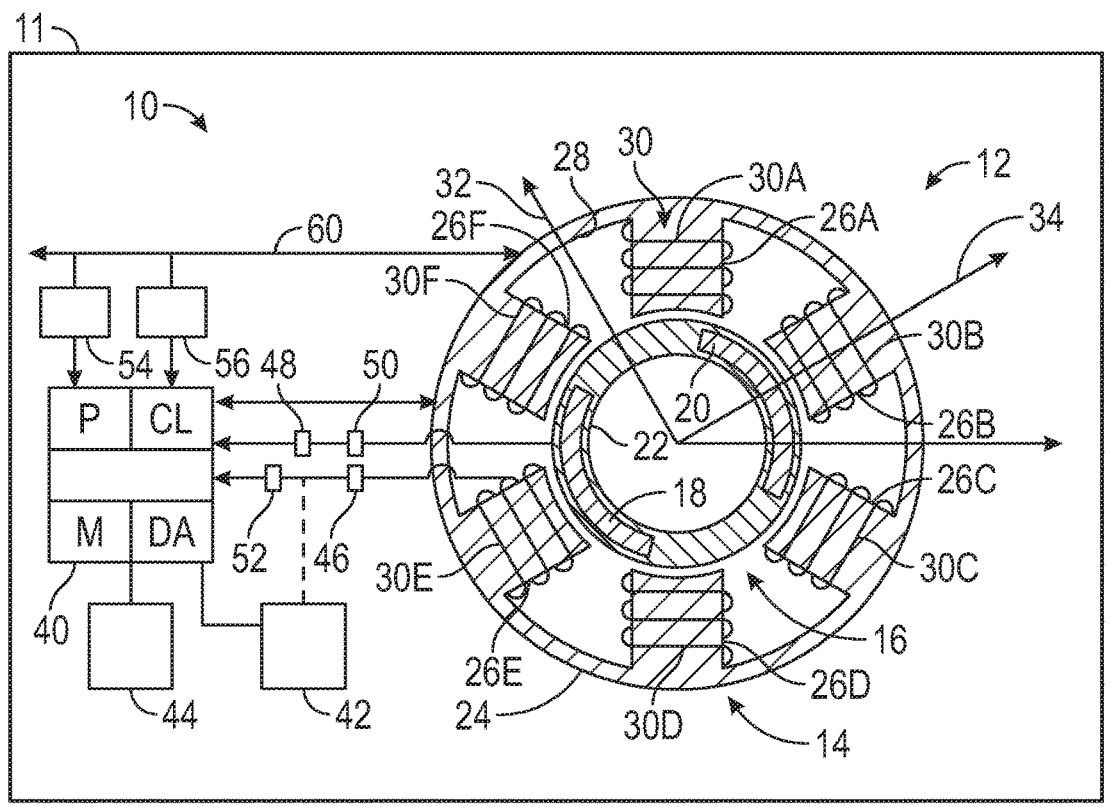
FIG. 1 is a schematic fragmentary partly sectional view of a propulsion system having an electric motor and a controller.

Referring to the drawings, wherein like reference numbers refer to like components, FIG. 1 schematically illustrates a propulsion system 10 for a device 11. The device 11 may be a mobile platform, such as, but not limited to, a passenger car, sport utility vehicle, light truck, heavy duty vehicle, ATV, minivan, bus, transit vehicle, bicycle, robot, farm implement (e.g. tractor), sports-related equipment (e.g. golf cart), boat, plane and train. The device 11 may take many different forms and include multiple and/or alternate components and facilities.

Referring to FIG. 1, the device 11 includes an electric motor 12 having a stator 14, and a rotor 16 which includes at least one permanent magnet. The rotor 16 may include a first permanent magnet 18 and a second permanent magnet 20 of alternating polarity around the outer periphery of a rotor core 22. The rotor 16 may include as many permanent magnets as required per the application; for simplicity two are shown. The rotor 16 defines a rotor electrical speed ($\omega_e$) and a rotor mechanical frequency ($\omega_m$), which are related as ($\omega_e = (P/2)*\omega_m$), where P is the number of pole pairs. While the embodiment shown in FIG. 1 illustrates a three-phase, single pole pair (i.e. two poles) machine, it is understood that the number of phases or pole pairs may be varied.

Referring to FIG. 1, the stator 14 includes a stator core 24 which may be cylindrically shaped with a hollow interior. The stator core 24 may include a plurality of inwardly-protruding stator teeth 26A-F, separated by gaps or slots 28. In the embodiment shown in FIG. 1, stator windings 30 may be operatively connected to the stator core 24, such as for example, being coiled around the stator teeth 26A-F. The electric motor 12 may include, but is not limited to, synchronous machines. While an example electric motor 12 is shown, the components illustrated in the FIG. are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature magnetic axis 32 (referred to herein as q-axis) and a direct magnetic axis 34 (referred to herein as d-axis) are shown. The first and second permanent magnets 18, 20 aid in the creation of a magnetic field and magnet flux linkage.

Referring to FIG. 1, the propulsion system 10 includes a controller 40 in communication, such as electronic communication, with the electric motor 12. The electric motor 12 is configured to provide a first torque contribution to a component of the device 11, such as for example, one or more wheels 42. The propulsion system 10 may include a secondary source 44, such as an internal combustion engine, configured to selectively provide a second torque contribution to propel the device 11, through the wheels 42, for example.

Figure 4:
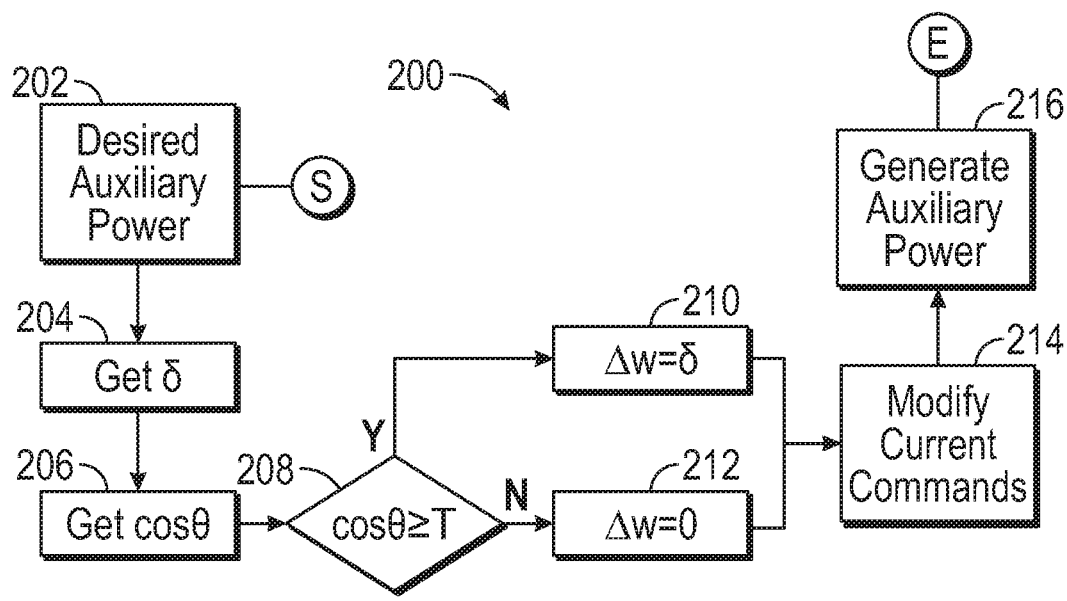
FIG. 4 is a flowchart for a method executable by the controller of FIG. 1.

The controller 40 includes at least one processor P and at least one memory M (or non-transitory, tangible computer readable storage medium) on which are recorded instructions for executing method 200, shown in FIG. 4, for generating auxiliary power. The memory M can store controller-executable instruction sets, and the processor P can execute the controller-executable instruction sets stored in the memory M. The method 200 modifies current commands to operate the electric motor 12 at a lower efficiency while continuing to produce the required torque below base speed, ensuring torque linearity. The auxiliary power may be consumed by various components having access to the cooling loop 60.

The controller 40 of FIG. 1 is specifically programmed to execute the blocks of the method 200 (as discussed in detail below with respect to FIG. 3) and may receive inputs from one or more sensors. Referring to FIG. 1, the propulsion system 10 may include a stator winding temperature sensor 46, a rotor temperature sensor 48, and a magnet flux linkage observer 50, each capable of measuring a respective physical factor and sending a respective signal to the controller 40. Additionally, controller 40 may be programmed to determine the respective physical factors by inputting the respective signals into a model or other estimation technique available to those skilled in the art. The propulsion system 10 may include a rotor position transducer 52 that measures the position of the rotor 16 and generates a rotor position signal.

Referring to FIG. 1, a direct current (DC) power source, such as a battery 54, is configured to provide a DC link voltage ($V_{dc}$) to the electric motor 12. An inverter 56 may be operatively connected to the controller 40 and the battery 54, and configured to convert DC current to alternating (AC) current. The controller 40 (via execution of method 200) is configured to modify the stator current commands to operate the electric motor 12 at a lower efficiency, while continuing to produce the requested torque below base speed, to ensure torque linearity. Referring to FIG. 1, the auxiliary power generated from the power loss may be distributed via an energy distribution or cooling loop 60. The auxiliary power may used to heat up the traction system or to assist with regenerative braking when the state of charge of the battery 54 is full. The torque accuracy of the electric drive is maintained while generating increased losses (heat) from the electric motor 12 and inverter 56.

Figure 2:
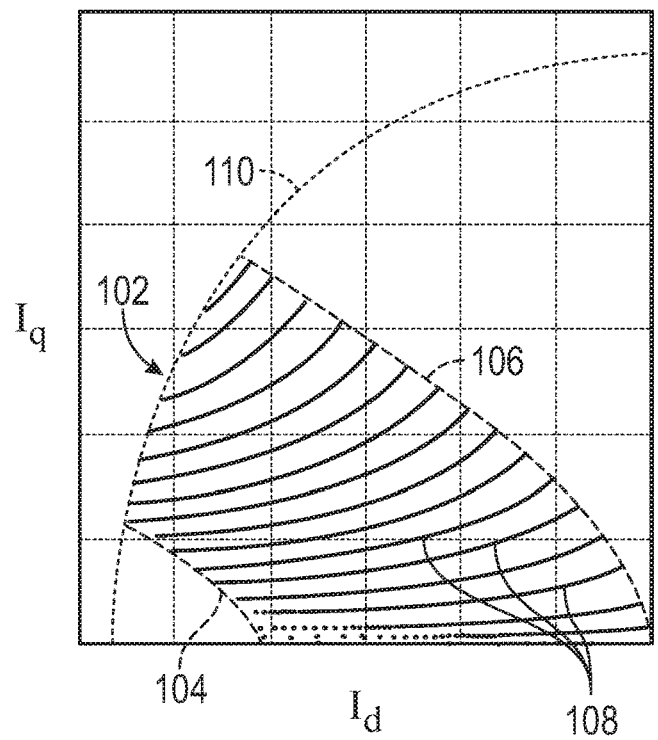
FIG. 2 is an example graph showing a region of interest, with a q-axis stator current on the vertical axis and a d-axis stator current on the horizontal axis.

Referring now to FIG. 2, an example graph is shown with q-axis stator current ($I_q$) on the vertical axis and d-axis stator current ($I_d$) on the horizontal axis. The modified stator current command generation may be limited to a region of interest 102 between a first line 104 and a second line 106, shown in FIG. 2. The first line 104 and the second line 106, correspond to maximum torque per ampere and a maximum torque per voltage, respectively. The plurality of traces 108 within the region of interest 102 each represent a constant torque value, while curve 110 represents a maximum stator current magnitude.

Figure 3:
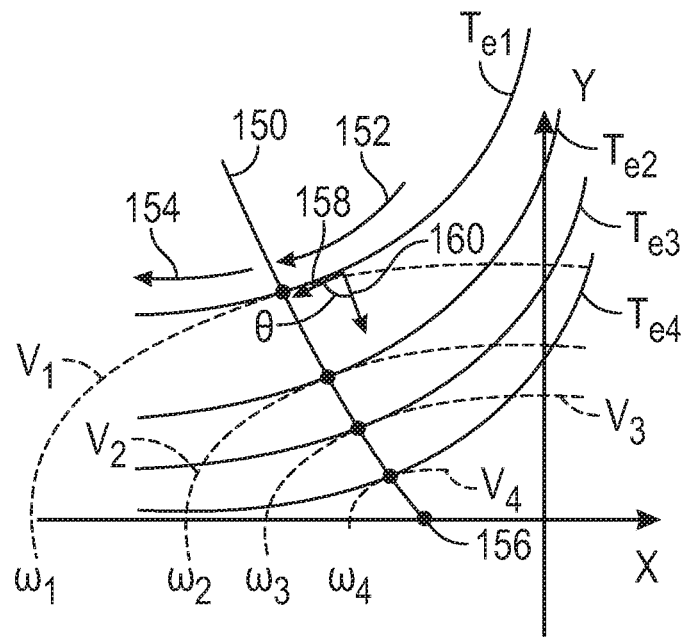
FIG. 3 is another example graph showing a plurality of constant torque loci and constant voltage ellipses, with q-axis stator current on the vertical axis and d-axis stator current on the horizontal axis.

FIG. 3 is another example graph with q-axis stator current on the Y axis and d-axis stator current on the X axis. Trace 150 illustrates the minimum torque per flux line, with the first arrow 154 indicating an increase of flux and the second arrow 152 indicating a decrease of flux. Point 156 indicates the x-intercept of the trace 150 and corresponds to the coordinates ($-\lambda_f/L_d$, 0). Here $\lambda_f$ is the rotor magnet flux magnitude and $L_d$ is a d-axis static inductance. An angle ($\theta$) is defined between a constant torque unit vector 158 and a decreasing voltage ellipse unit vector 160. Also illustrated in FIG. 3 is a plurality of constant torque loci, including first loci $T_{e1}$, second loci $T_{e2}$, third loci $T_{e3}$ and fourth loci $T_{e4}$, and a plurality of constant voltage ellipses, including first ellipse $V_1$, second ellipse $V_2$, third ellipse $V_3$ and fourth ellipse $V_4$ (each at a respective frequency $\omega_1$, $\omega_2$, $\omega_3$ and $\omega_4$).

Referring now to FIG. 4, a flowchart of the method 200 stored on and executable by the controller 40 of FIG. 1 is shown. Method 200 need not be applied in the specific order recited herein. Furthermore, it is to be understood that some blocks may be omitted. In block 202 of FIG. 4, the controller 40 is configured to obtain a desired auxiliary power ($P_{desired}$) (power loss) command and an estimated power loss ($P_{loss}$). The desired auxiliary power ($P_{desired}$) may originate from a higher-level supervisory controller or other module in communication with the controller 40, and may be depend on various factors affecting the propulsion system 10. Additionally, a desired temperature command may be used to calculate the desired auxiliary power. The estimated power loss ($P_{loss}$) may be calculated as a sum of losses in the electric motor 12 and the inverter 56. The motor loss may be represented as a sum of the winding (copper) loss and core loss.

Motor Loss=Winding Loss+Core Loss

The winding loss may be determined as $(3/2 I_s^2 R_s)$, where $I_s$ is the magnitude of the stator current vector and $R_s$ is the stator resistance. The core loss may be determined as a function of rotor speed and the stator current vector magnitude. The inverter loss may include conduction losses and switching losses, both of which are functions of stator current vector magnitude and inverter switching frequency. The estimated power loss may be calculated using methods available to those skilled in the art.

In block 204 of FIG. 4, the controller 40 is configured to obtain a delta factor ($\delta$) based at least partially on the desired auxiliary power, limited to a maximum allowable power loss, and an estimated power loss. The delta factor ($\delta$) may be obtained by a closed-loop control module ("CL" in FIG. 1) configured to obtain an error value (E) as a difference between a desired auxiliary power ($P_{desired}$), limited to a maximum allowable power loss for the electric motor 12, and the estimated power loss ($P_{loss}$)(obtained in block 202).

$$E = [^{LIM} P_{desired} - P_{loss}]$$

The closed-loop control module is configured to minimize the error value over time by adjusting the delta factor ($\delta$). The closed-loop control module CL may be a proportional-integral (PI) control module or a proportional-integral-derivative (PID) control module. As understood by those skilled in the art, a PI control module and PID control module employs a feedback loop continuously calculating an error value, the error value being the difference between a desired value and a measured process variable. The PI control module applies a correction based on proportional and integral terms, while the PID control module further includes a derivative term. The error value is minimized over time by adjusting a control variable (delta factor in this case) to a new value. The delta value ($\delta$) obtained per block 204 of FIG. 4 is used to command less optimal current command values from a current command generation function.

Per block 206, the controller 40 is configured to obtain a cosine of the angle ($\theta$) between the constant torque unit vector and the decreasing voltage ellipse unit vector. FIG. 3 depicts an example of the angle ($\theta$) between a constant torque unit vector 158 and a decreasing voltage ellipse unit vector 160. The cosine of the angle ($\theta$) may be obtained as an inner product of the constant torque unit vector ($T_1, T_2$) and the decreasing voltage ellipse unit vector ($V_1, V_2$) such that: $\cos\theta = T_1 \cdot V_1 + T_2 \cdot V_2$. The constant torque unit vector ($T_1, T_2$) may be based in part on a partial derivative of the torque request ($T_e$) with respect to a measured q-axis current ($i_q$) and a measured d-axis current ($i_d$) such that:

$$(T_1, T_2) = \left\| -\frac{\partial T_e}{\partial i_q}, \frac{\partial T_e}{\partial i_d} \right\|$$

The decreasing voltage ellipse unit vector ($V_1, V_2$) may be based in part on a partial derivative of a voltage cost function (J) with respect to the measured q-axis current ($i_q$) and the measured d-axis current ($i_d$) such that:

$$(V_1, V_2) = \left\| -\frac{\partial J}{\partial i_d}, -\frac{\partial J}{\partial i_q} \right\|$$

The voltage cost function (J) may be based on a d-axis voltage command ($v_d$) and a q-axis voltage command ($v_q$) such that: $J = 1/2(v_d^2 + v_q^2)$. The d-axis voltage command ($v_d$) may be obtained as: $v_d = (i_d * R_s - i_q * \omega' L_q)$. The q-axis voltage command ($v_q$) is obtained as: $v_q = (\lambda_f \omega' + i_q * R_s + i_d * \omega' L_d)$. Here, $\lambda_f$ is a rotor magnet flux magnitude, $R_s$ is a stator resistance, $i_d^*$ is the d-axis stator current command, $i_q^*$ is the q-axis stator current command, $\omega'$ is the modified rotor speed, $L_d$ is a d-axis static inductance and $L_q$ is a q-axis static inductance. The cosine of the angle ($\theta$) may be calculated online to account for DC-link voltage variations.

In block 208 of FIG. 4, the controller 40 is configured to determine if the cosine of the angle ($\theta$) is greater than or equal to a predefined threshold (T). In one example, the predefined threshold T is in range between 0 and 0.15. When the cosine of the angle ($\theta$) is greater than or equal the predefined threshold (T), the method 200 proceeds to block 210, where the speed modifier is set to the delta factor ($\Delta\omega = \delta$). If the cosine of the angle ($\theta$) is less than the predefined threshold (T), the method 200 proceeds to block 212, where the speed modifier is set to zero ($\Delta\omega = 0$). The method 200 proceeds to block 214 from blocks 210 and 212.

In block 214, the controller 40 is programmed to determine the modified stator current commands to generate the auxiliary power. First, a modified rotor speed is obtained as a sum of an original rotor speed and the speed modifier ($\Delta\omega$). Next, the modified rotor speed is inputted to the current command generation function. The modified stator current commands, including a d-axis stator current command and a q-axis stator current command, may be obtained through a data access module DA (see FIG. 1) based on the modified rotor speed, the torque request and the DC link voltage ($V_{dc}$). The data access module DA may be configured to store and/or retrieve data (e.g. from a remote server) as required by the controller 40. The data may include a look-up table or other repository obtained in a laboratory or test cell conditions, from simulations and/or from finite element analysis (FEA) based methods. Referring to FIG. 2, the current command generation lookup tables may be limited to the region of interest 102 between the first line 104 and the second line 106, corresponding to maximum torque per voltage and maximum torque per ampere, respectively. The cosine of the angle ($\theta$) between the constant torque unit vector 158 and the decreasing voltage ellipse unit vector 160 defines the start of the maximum torque per voltage line.

In block 216 of FIG. 4, the controller 40 is configured to generate the auxiliary power by commanding the electric motor 12 to the modified stator current commands. The controller 40 may be configured to at least partially direct the auxiliary power, through the cooling loop 60 of FIG. 1, to warm up the inverter 56 and/or the battery 54. The cooling loop 60 may be composed of a thermal transferring or thermally conductive material available to those skilled in the art. It is understood that the auxiliary power may be directed to other purposes. For example, the auxiliary power may be used to assist with regenerative braking when the state of charge of the battery 54 is full.

In summary, method 200 enables production of accurate torque from the electric motor 12 while increasing the amount of losses from the electric drive. A delta factor is generated in order to command less optimal current command values from the current command generation function.

This modified speed value is used to force the current command generation function to select current commands in the flux weakening region of the electric motor 12. The amount of speed modification may be obtained by a closed-loop control module CL. The method 200 improves functioning of the device 11 by enabling-the generation of auxiliary power which can be directed to various purposes.

The controller 40 of FIG. 1 may be an integral portion of, or a separate module operatively connected to, other controllers of the device 11. The controller 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A propulsion system comprising: an electric motor including a rotor with at least one permanent magnet and a stator;
a controller configured to receive a torque request and selectively command the electric motor based in part on the torque request;
wherein the controller has a processor and tangible, non-transitory memory on which instructions are recorded for a method of generating an auxiliary power, execution of the instructions by the processor causing the controller to:
determine a desired auxiliary power based on the torque request;
obtain a delta factor ($\delta$) based on the desired auxiliary power and an estimated power loss;
set the delta factor ($\delta$) as a speed modifier ($\Delta\omega$) when a cosine of an angle ($\theta$) between a first vector and a second vector is greater than or equal to a predefined threshold;
obtain a modified rotor speed as a sum of an original rotor speed and the speed modifier ($\Delta\omega$);
obtain modified stator current commands based in part on the modified rotor speed and the torque request; and
generate the auxiliary power by commanding the modified stator current commands.

2. The propulsion system of claim 1, wherein:
the controller is configured to set the speed modifier ($\Delta\omega$) to zero when the cosine of the angle ($\theta$) is less than the predefined threshold.

3. The propulsion system of claim 1, wherein:
the delta factor ($\delta$) is obtained by a closed-loop control module configured to obtain an error value as a difference between the desired auxiliary power ($P_{desired}$) and the estimated power loss ($P_{loss}$), limited to a maximum allowable power loss ($P_{loss,max}$); and
the closed-loop control module is configured to minimize the error value over time by adjusting the delta factor ($\delta$).

4. The propulsion system of claim 1, wherein:
the first vector is a constant torque unit vector ($T_1$, $T_2$) and the second vector is a decreasing voltage ellipse unit vector ($V_1$, $V_2$); and
the cosine of the angle ($\theta$) is obtained as an inner product of the constant torque unit vector ($T_1$, $T_2$) and the decreasing voltage ellipse unit vector ($V_1$, $V_2$) such that: $\cos\theta = (T_1 \cdot V_1 + T_2 \cdot V_2)$.

5. The propulsion system of claim 4, wherein:
the constant torque unit vector ($T_1$, $T_2$) is based in part on a partial derivative of the torque request ($T_e$) with respect to a measured q-axis current ($i_q$) and a measured d-axis current ($i_d$) such that:

$$(T_1, T_2) = \left\| -\frac{\partial T_e}{\partial i_q}, \frac{\partial T_e}{\partial i_d} \right\|.$$

6. The propulsion system of claim 4, wherein:
the decreasing voltage ellipse unit vector ($V_1$, $V_2$) is based in part on a partial derivative of a voltage cost function (J) with respect to the measured q-axis current ($i_q$) and the measured d-axis current ($i_d$) such that:

$$(V_1, V_2) = \left\| -\frac{\partial J}{\partial i_d}, -\frac{\partial J}{\partial i_q} \right\|;$$

and
the voltage cost function (J) is based on a d-axis voltage command ($v_d$) and a q-axis voltage command ($v_q$) such that: $J=\frac{1}{2}(v_d^2+v_q^2)$.

7. The propulsion system of claim 6, wherein:
the d-axis voltage command ($v_d$) is obtained as: $v_d=(i_d*R_s-i_q*\omega'L_q)$;
the q-axis voltage command ($v_q$) is obtained as: $v_q=(\lambda_f\omega'+i_q*R_s+i_d*\omega'L_d)$; and
$\lambda_f$ is a rotor magnet flux magnitude, $R_s$ is a stator resistance, $i_d*$ is the d-axis stator current command, $i_q*$ is the q-axis stator current command, $\omega'$ is the modified rotor speed, $L_d$ is a d-axis static inductance and $L_q$ is a q-axis static inductance.

8. The propulsion system of claim 1, further comprising:
an inverter operatively connected to the electric motor;
a cooling loop in thermal communication with the inverter and the electric motor; and
wherein the controller is configured to at least partially direct the auxiliary power, through the cooling loop, to the inverter.

9. The propulsion system of claim 1, further comprising:
a direct current power source configured to provide a DC link voltage ($V_{dc}$) to the electric motor;
a cooling loop in thermal communication with the direct current power source and the electric motor; and
wherein the controller is configured to at least partially direct the auxiliary power, through the cooling loop, to the direct current power source.

10. The propulsion system of claim 1, further comprising:
a direct current (DC) power source configured to provide a DC link voltage ($V_{dc}$) to the electric motor; and
wherein the modified stator current commands include a d-axis stator current command and a q-axis stator current command obtained from a stored data module based on the modified rotor speed, the torque request and the DC link voltage ($V_{dc}$).

11. A method of operating an electric motor in a propulsion system, the electric motor having a stator and a rotor with at least one permanent magnet, the propulsion system having a controller with a processor and tangible, non-transitory memory, the method comprising:
obtaining a desired auxiliary power and a delta factor ($\delta$) based at least partially on the desired auxiliary power and an estimated power loss, via the controller;
setting the delta factor ($\delta$) as a speed modifier ($\Delta\omega$) when a cosine of an angle ($\theta$) between a first vector and a second vector is greater than or equal to a predefined threshold, via the controller;
obtaining a modified rotor speed as a sum of an original rotor speed and the speed modifier ($\Delta\omega$), via the controller;
obtaining modified stator current commands based in part on the modified rotor speed and a torque request, via the controller; and
generating the auxiliary power by commanding the modified stator current commands, via the controller.

12. The method of claim 11, further comprising:
setting the speed modifier ($\Delta\omega$) to zero when the cosine of the angle ($\theta$) is less than the predefined threshold, via the controller.

13. The method of claim 11, further comprising:
obtaining the delta factor ($\delta$) based on a closed-loop control module;
configuring the closed-loop control module to obtain an error value as a difference between the desired auxiliary power ($P_{desired}$) and the estimated power loss ($P_{loss}$), limited to a maximum allowable power loss ($P_{loss,max}$); and
configuring the closed-loop control module to minimize the error value over time by adjusting the delta factor ($\delta$).

14. The method of claim 11, further comprising:
setting a constant torque unit vector ($T_1$, $T_2$) as the first vector and a decreasing voltage ellipse unit vector ($V_1$, $V_2$) as the second vector; and
obtaining the cosine of the angle ($\theta$) as an inner product of the constant torque unit vector ($T_1$, $T_2$) and the decreasing voltage ellipse unit vector ($V_1$, $V_2$) such that: $\cos\theta=(T_1\cdot V_1+T_2\cdot V_2)$.

15. The method of claim 14, further comprising:
obtaining the constant torque unit vector ($T_1$, $T_2$) based in part on a partial derivative of the torque request ($T_e$) with respect to a measured q-axis current ($i_q$) and a measured d-axis current ($i_d$) such that:

$$(T_1, T_2) = \left\| -\frac{\partial T_e}{\partial i_q}, \frac{\partial T_e}{\partial i_d} \right\|.$$

16. The method of claim 14, further comprising:
obtaining the decreasing voltage ellipse unit vector ($V_1$, $V_2$) based in part on a partial derivative of a voltage cost function (J) with respect to the measured q-axis current ($i_q$) and the measured d-axis current ($i_d$) such that:

$$(V_1, V_2) = \left\| -\frac{\partial J}{\partial i_d}, -\frac{\partial J}{\partial i_q} \right\|;$$

and
obtaining the voltage cost function (J) based on a d-axis voltage command ($v_d$) and a q-axis voltage command ($v_q$) such that: $J=\frac{1}{2}(v_d^2+v_q^2)$.

17. The method of claim 16, further comprising:
obtaining the d-axis voltage command ($v_d$) as: $v_d=(i_d*R_s-i_q*\omega'L_q)$;
obtaining the q-axis voltage command ($v_q$) as: $v_q=(\lambda_f\omega'i_q*R_s+i_d*\omega'L_d)$; and
wherein $\lambda_f$ is a rotor magnet flux magnitude, $R_s$ is a stator resistance, $i_d*$ is the d-axis stator current command, $i_q*$ is the q-axis stator current command, $\omega'$ is the modified rotor speed, $L_d$ is a d-axis static inductance and $L_q$ is a q-axis static inductance.

18. The method of claim 11, further comprising:
operatively connecting an inverter and a direct current power source to the electric motor;
positioning a cooling loop in thermal communication with the inverter, the direct current power source and the electric motor; and
directing the auxiliary power, through the cooling loop, to at least one of the direct current power source and the inverter.

19. An electric vehicle comprising:
a propulsion system with an electric motor including a rotor with at least one permanent magnet and a stator;
a controller configured to receive a torque request and selectively command the electric motor;
wherein the controller has a processor and tangible, non-transitory memory on which instructions are recorded for a method of generating an auxiliary power, execution of the instructions by the processor causing the controller to:

obtain a desired auxiliary power and a delta factor ($\delta$) based at least partially on the desired auxiliary power and an estimated power loss;

set the delta factor as a speed modifier ($\Delta\omega=\delta$) when a cosine of an angle ($\theta$) between a constant torque unit vector ($T_1$, $T_2$) and a decreasing voltage ellipse unit vector ($V_1$, $V_2$) is greater than or equal to a predefined threshold;

set the speed modifier to zero ($\Delta\omega=0$) when the cosine of the angle ($\theta$) is less than the predefined threshold;

obtain a modified rotor speed as a sum of an original rotor speed and the speed modifier ($\Delta\omega$);

obtain modified stator current commands based in part on the modified rotor speed and the torque request; and generate the auxiliary power by commanding the modified stator current commands.

* * * * *